Figure 1:
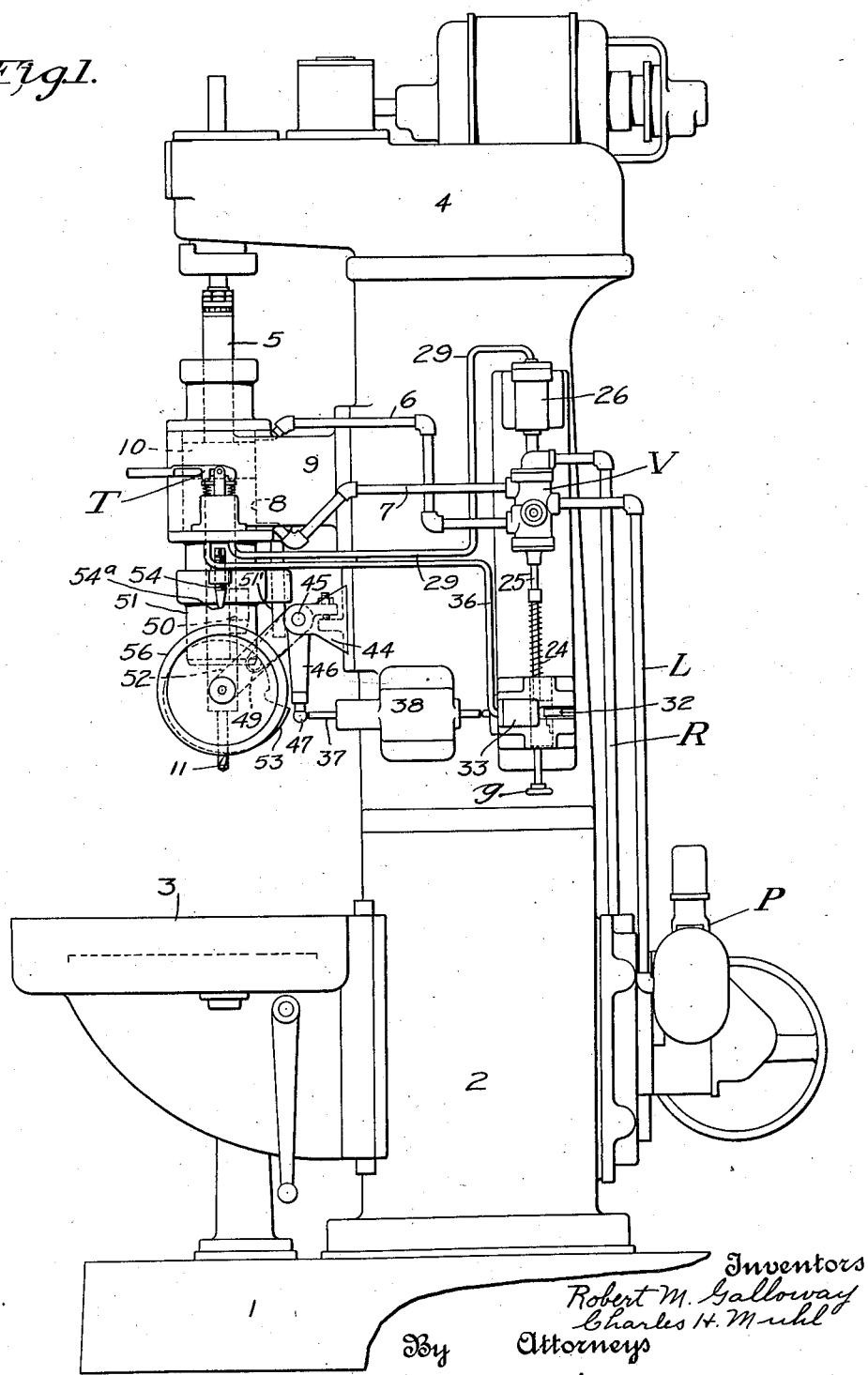

June 24, 1930. R. M. GALLOWAY ET AL 1,766,118
FEED CONTROL FOR HYDRAULICALLY OPERATED MACHINES
Filed Sept. 8, 1928 3 Sheets-Sheet 3
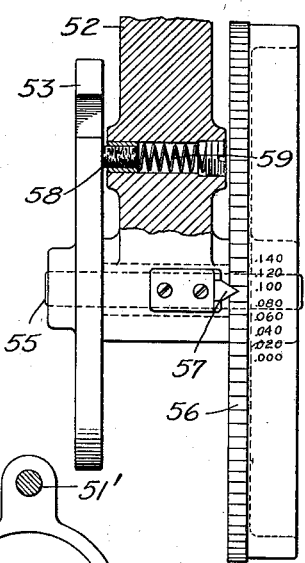
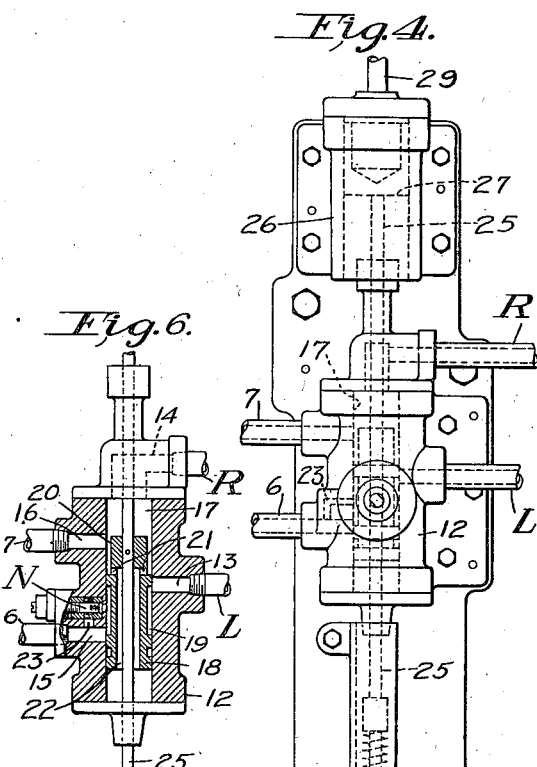
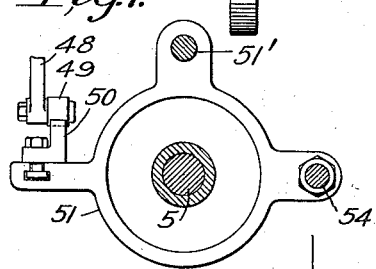
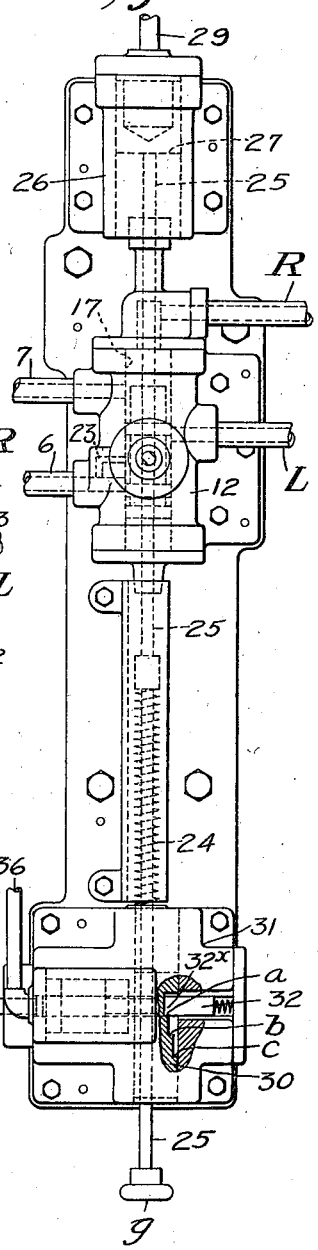
Inventors
Robert M. Galloway
Charles H. Muhl
By Attorneys
Nathan & Bowman Patented June 24, 1930

1,766,118

UNITED STATES PATENT OFFICE

ROBERT M. GALLOWAY AND CHARLES HENRY MUHL, OF RICHMOND, INDIANA, ASSIGNORS TO THE NATIONAL AUTOMATIC TOOL COMPANY, OF RICHMOND, INDIANA, A CORPORATION OF INDIANA

FEED CONTROL FOR HYDRAULICALLY-OPERATED MACHINES

Application filed September 8, 1928. Serial No. 304,712.

Recently a machine has been developed which is adapted to determine whether an element (such for example as a crank shaft) is "out of balance," to indicate where it is out of balance and, in combination with a suitable chart, to indicate the amount of metal required to be removed therefrom to put the element "in balance." Furthermore this machine and its cooperating chart indicate that said metal may be removed by drilling into the element, to an indicated depth, one or more holes of a given diameter. For example, it may disclose that an element is out of balance and that it may be put in balance by drilling therein, at an indicated side, two $\frac{5}{16}$ inch holes to a depth of .160 inch. It will readily be perceived that in order to obtain precision in balancing, great care must be taken to insure that precisely the proper amount of metal be removed and, to that end, that the holes be drilled to exactly the required depth as indicated, in extremely small fractions of an inch, by the testing machine.

Heretofore, the holes have been drilled one at a time and the drill has been fed into the work by hand to the proper depth, as shown by a suitable indicator, after which the drill spindle has been retracted, also by hand. This manual operation and control has required the constant attention of the operator during the complete cycle and the accuracy of the depth of drilling has been dependent entirely upon his skill.

It is to be remembered that in this balancing operation each work piece is, in effect, a separate and distinct job inasmuch as seldom, if ever, will two successive pieces be out of balance precisely the same amount or at precisely the same point. It will therefore be perceived that the operator's attention must be kept closely centered on his work; that great care must be exercised in stopping the drill feed at the proper point; that the balancing operation therefore is slow; that the operator necessarily works under a nervous strain which produces fatigue; and that any slight deviation or error necessarily must result in imperfectly balanced work.

This invention proposes a hydraulically actuated feed mechanism for a drill spindle and an automatic control therefor, whereby a hole may be drilled precisely to a predetermined depth, the feed then discontinued and the drill spindle immediately thereafter retracted. With this improved control the operator is required only to effect a suitable setting of a depth gauge, in accordance with the reading obtained from the testing machine, and then to trip the drilling machine into operation, the cycle thereafter being performed automatically. As the result of this automatic control it becomes practicable to drill, in a single operation, all the holes required to put an element in balance as indicated by the testing machine.

Furthermore this invention proposes an improved automatic control for hydraulically actuated feeding mechanisms whereby the drill (or drills) automatically may be given a rapid advance, to bring the point thereof adjacent the work piece, then to discontinue the rapid traverse movement and effect slow feeding movement of the drill until the drill has been fed into the work precisely to the proper depth, and then to effect rapid retraction of the drill. This automatic control is effected through cyclic actuation of a valve which controls the flow of fluid to a hydraulic motor which translates the spindle.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
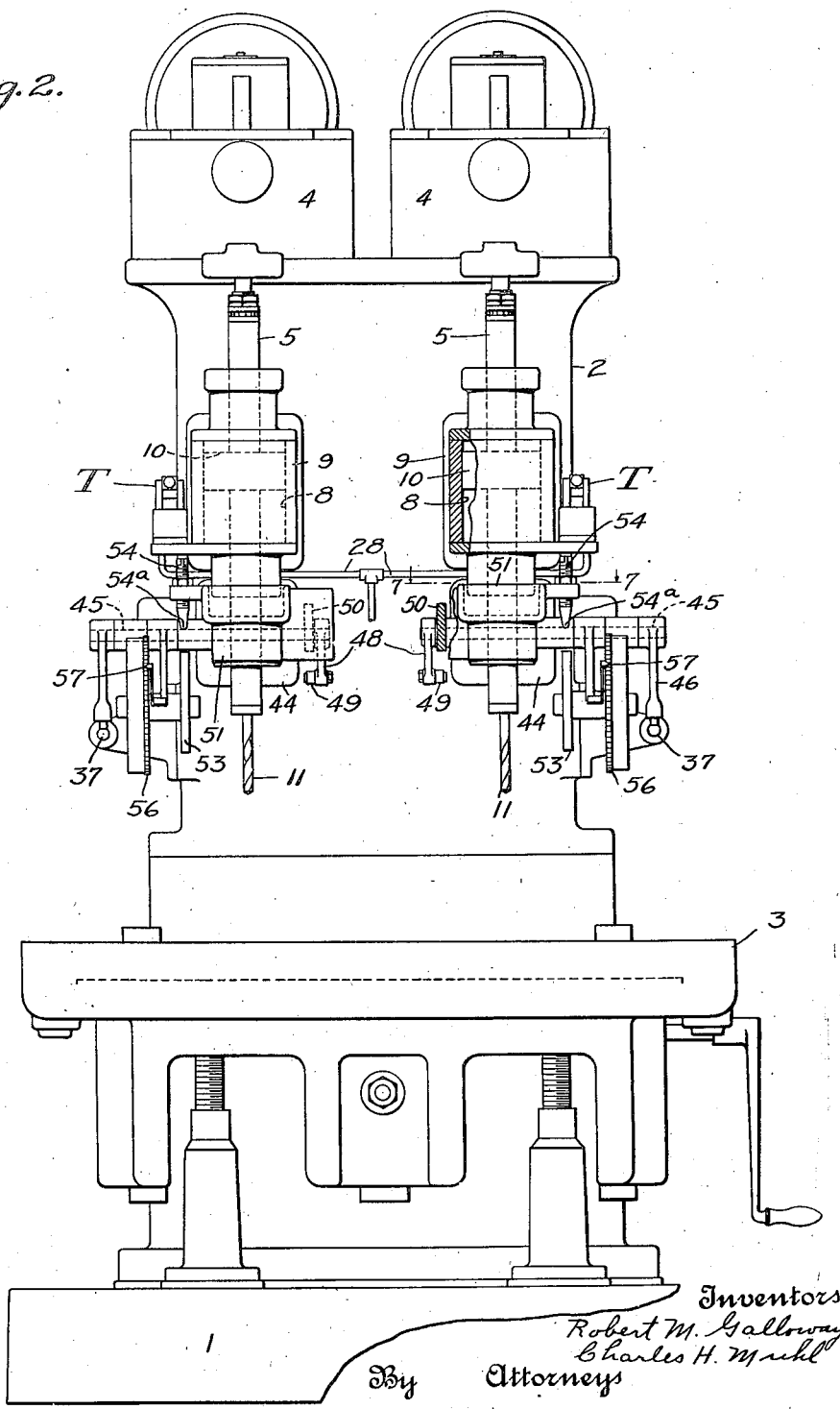

Figure 1 is a side elevation of a drilling machine embodying the present invention. Fig. 2 is a front view thereof. Fig. 3 is a detail view of a feed throw-out cam and a graduated disk by means of which the cam is set to throw out the spindle down feed at a predetermined point. Fig. 4 is a detail view of an automatically controlled valve mechanism which serves to control the flow of actuating fluid to give the spindles advance and retractive movements. Fig. 5 is a detail sectional view of valve control means later to be described. Fig. 6 is a detail section view of the hydraulic control valve. Fig. 7 is a horizontal section on the line 7—7 of Fig. 2.

Referring more specifically to the drawings the invention is disclosed as embodied in a drilling machine comprising a base 1, a frame or column 2, and a work-table 3. Upon the upper end of the column are secured one or more heads 4, each of which provides mechanism for rotating a suitable drill spindle 5. Inasmuch as the spindle rotating means forms no part of the present invention, detailed illustration and description thereof is deemed unnecessary. In Fig. 2 the column is shown supporting two spindle rotating heads each with its associate spindle and spindle feed means. It is to be understood however that, if desired, the machine may be equipped with a single spindle and spindle actuating means or it may be equipped with a greater number than shown. Inasmuch as all of the spindles and their feeding and controlling means are identical a description of one will suffice for all.

The work piece (not shown) is supported upon the work-table 3 in any suitable or preferred manner such for example as by being held in a suitable jig or fixture.

Reciprocatory movements are given to the drill spindles hydraulically by means of fluid pressure provided by a suitable pump P. This pump draws fluid (preferably oil) from a reservoir (not shown) and exhausts it through a pressure line L which connects with the casing of a control valve V later to be described. Conduits 6 and 7 connect the valve casing with the upper and lower ends, respectively, of a hydraulic cylinder 8 provided by a feed-bracket 9 secured upon the forward face of the column. Within the cylinder 8 there is slidingly fitted a piston 10, carried by the spindle 5, which latter carries at its lower end the usual drill point 11. It will readily be perceived that if fluid pressure is admitted into the cylinder 8 through the conduit 6 the piston 10 and its attached spindle will be moved downwardly and that if fluid is admitted through the conduit 7 the piston and spindle will be moved upwardly. The rate of the movement of the spindle is dependent upon the rate of flow of fluid into the cylinder 8. It is to be understood that the control valve so functions that when fluid is admitted to the cylinder 8 through the conduit 6 the conduit 7 is connected with a return line R which extends to the reservoir. Likewise the conduit 6 is connected with the return line when fluid is admitted through the conduit 7.

The control valve V comprises a casing 12 formed with ports 13, 14, 15, and 16 connecting, respectively, with the conduits L, R, 6 and 7, and a bore 17 within which is slidingly fitted a valve piston 18 having an annular passage 19 adapted alternately to direct the flow of fluid from the port 13 to the ports 15 and 16. The valve piston is also formed with a reduced portion 20 and radial ports 21 connected with a central bore 22 which serve to permit exhaust of fluid from the upper end of the cylinder 8, through the conduit 6, to the drain conduit R when fluid is flowing through the conduit 7 into the lower end of said cylinder. A restricted passage 23 connects the bore 17 with the conduit 6 and, in a certain position of the piston 18, permits only a relatively slow flow of fluid from the pressure line P to the conduit 6 thereby to produce relatively slow feeding movements of the spindle. A regulating valve N embodied in the passage 23 controls the rate of flow therethrough.

To initiate a cycle the valve piston 18 is depressed, in opposition to a spring 24, to the position shown in Fig. 6. This may be effected either by actuating a starting valve T, supported by the feed bracket, or by pulling downwardly on the hand grasp $g$ secured upon rod 25 to which the valve piston 18 also is secured. The upper end of the rod 25 enters a cylinder 26 and has affixed to it a piston 27 slidable in said cylinder. Actuation of the valve T in one direction admits fluid under pressure from a line 28 (see Fig. 2) through a conduit 29 into the upper end of the cylinder 26, thereby causing the rod 25 and the valve piston 18, carried thereby, to be depressed to the position shown in Fig. 6.

Adjacent its lower end the rod 25 carries a block 30 slidingly fitted within a guideway formed in a bracket 31 secured to the column. This block is provided with detent shoulders $a$, $b$, and $c$ adapted to engage a spring pressed detent element 32, also slidingly fitted in the bracket 31. When the block 30 is in the position shown in Fig. 4, i. e. with the shoulder $a$ in contact with the portion $32^x$ of the detent 32, the valve piston 18 is maintained in the position shown in Figs. 4 and 6, whereupon fluid from the line L flows through port 13, passage 19, passage 23 and port 15 to the conduit 6, thereby effecting rapid traverse of the drill spindle toward the work. When the detent element 32 is moved out of the path of the shoulder $a$ and into the path of the shoulder $b$ the rod 25 and valve piston are moved upwardly by the spring 24, the port 15 is isolated from the pressure line and fluid flows from said line through port 13, passage 19 and restricted passage 23 to the conduit 6, thereby effecting slow feeding movement of the spindle. When the detent element is shifted out of the path of the shoulder $b$ into the path of the shoulder $c$ the rod 25 and valve piston are again moved upwardly and into a position wherein fluid flows from the line L to the conduit 7 through port 17, passage 19 and port 16 thereby causing the spindle to be retracted at a rapid rate. In the last named position of the valve piston 18, fluid is exhausted from the upper end of the cylinder 8 through conduit 6, port 15, bore 22, ports 21, port 14 and conduit R.

In the operation of machines of this type it sometimes happens that a tool is broken. To enable the cycle to be interrupted and the drill spindle immediately to be returned to its retracted position, should breakage occur, the bracket 31 is formed with a cylinder 33 in which is slidingly fitted a piston 34 having secured to it, at one end, a rod 35 adapted to engage the detent element 32. A fluid conduit 36 connects with the cylinder 33 at the other end of the piston and, by manipulation of the valve T, fluid may be admitted from the line 28 through the conduit 36 into the cylinder 33 to force the detent element out of the paths of the shoulders $a$ and $b$ thereby to permit the valve piston 18 to be moved to its position in which it effects retraction of the drill spindle.

This invention relates more particularly to means for automatically shifting the valve piston 18 at predetermined times whereby, when once set in motion, the drill spindle will be given a rapid advance movement to bring the drill point to the work; a slow feeding movement of predetermined amplitude, and a rapid retractive movement. To that end, means are provided for automatically shifting the detent element 32 to remove the portion 32$^x$ out of the paths of the shoulders $a$ and $b$ of the block 30. This means includes a push rod 37 slidingly fitted with a bracket 38 secured to the column 2. One end of the rod acts upon the detent element 32 and the other end of the rod is engaged by an automatically actuated mechanism later to be described. The rod 37 may directly engage the detent element 32 or it may actuate said element through the medium of a slide pin 39. The rod 37 is normally forced in the direction of the arrow $f$ (Fig. 4) by a spring 40 surrounding said rod and having one end in engagement with a wall 41, of a bore 42, and its other end in engagement with a collar 43 fixed to the rod 37.

Within a bracket 44, fixed to the column 2, is journaled a shaft 45 to one end of which is fixed an arm 46 which carries a ball end 47 maintained in engagement with the rod 37. To the other end of the shaft 45 is secured an arm 48 carrying a stud 49, adapted, upon downward movement of the spindle, to be engaged by a cam 50 secured upon a member 51 fixed upon and translatable with the spindle. Contact of the cam 50 with the stud 49 acts to rotate the shaft 45 which, through arm 46 and rod 37, shifts the detent member 32 out of the path of the shoulder $a$ thereby causing the valve piston 18 to discontinue the rapid traverse of the spindle and to start its slow feed. This preferably takes place just as the point of the drill engages the work. The member 51 is slidingly connected to a bar 51' carried by the feed bracket 9, to prevent rotation of said member.

A third arm 52 also is secured to the shaft 45 and carries at its outer end a rotatable cam 53 having a spiral periphery in the nature of a fusee, which, when the spindle has been given a predetermined feeding movement, is engaged by the end 54$^a$ of a trip dog 54 adjustably supported in the member 51. This engagement causes the arm 52, shaft 45 and arm 46 to be rocked, again to shift the detent element 32, thereby to move it out of the path of the shoulder $b$ and permit the valve piston 18 to be moved to a position to retract the drill spindle.

It will readily be perceived that the depth to which the drill (or drills) is caused to enter the work is determined by the distance between the end 54$^a$ of the stud and the periphery of the cam 53 where said end engages. To very accurately regulate this depth, this invention proposes securing the cam 53 to one end of a shaft 55 journaled in the arm 52 and fixing to the other end of said shaft a graduated dial 56. A pointer 57, carried by the arm 52, cooperates with the graduations of said dial to indicate to the operator, in any given setting, the depth to which the drill will enter the work before the forward feed is discontinued and the drill spindle is retracted.

To prevent accidental rotation of the dial 56 and cam 53 there is provided a friction device (see Fig. 3) comprising a friction element 58 which bears against the side face of the cam 53 under the action of a coil spring 59, housed within a chamber formed in the arm 52.

From the foregoing it will be perceived that having determined, by use of the balancing machine referred to, that an element is out of balance and that to put it in balance one or more holes of a given diameter should be drilled therein to an indicated depth, the operator readily may set up the work piece, adjust the dial 56 with respect to the pointer 57 to give the required depth of feed, actuate the starting valve T and thereafter the rapid down traverse of the drill spindle, feed to a predetermined depth and retraction of the spindle will be performed automatically. Inasmuch as each spindle is controlled independently of every other spindle the depth to which each drill enters the work may be individually determined.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States:—

1. A machine combining a translatable member; hydraulic means to give to said member feeding movements; a control valve for said hydraulic feeding means; automatic means to actuate said control valve to limit the feed of said member, said automatic means comprising a movable member operatively connected to actuate said control valve; a cam, having a spiral periphery, pivoted upon said movable member; a feed throw-out element carried by said translatable member and adapted to engage the spiral periphery of said cam to cause bodily movement of said cam and its supporting member, thereby to actuate said feed control valve; and means for holding said cam in any desired position of angular adjustment to present to said feed throw-out element selected contact points at various distances from the pivot of said cam.

2. A machine tool combining a translatable member; hydraulic means to give to said member feeding movements; a control valve for said feeding means; automatic means to actuate said control valve to limit the extent of feed of said member, said automatic means comprising a shiftable member operatively connected with said control valve; a feed throw-out element translatable with said translatable member; a member pivoted upon said shiftable member and having a periphery eccentric to its pivot, said pivoted member being rotatably adjustable on its support selectively to present contact points to the action of said feed throw-out element at various positions of said element; and a graduated dial operatively connected with said pivoted member for indicating the amount of feed to be given to the translatable member in any given setting of said pivoted member.

3. A drilling machine combining a frame; a rotatable and translatable drill spindle; a hydraulic transmission for translating said drill spindle; a valve adapted to control the action of said transmission; automatic means actuated in timed relation with the translation of said spindle to give to said spindle feeding and traversing movements, said means including an oscillatory shaft; an operative connection between said shaft and said control valve; two arms fixed to said shaft; a cam movable with said drill spindle and adapted to shift one of said arms thereby to cause shifting of said valve to discontinue traverse movement of said spindle and initiate a feeding movement thereof; a feed control member adjustably secured to the other of said arms and provided with a spiral periphery; and a trip dog translatable with said spindle and adapted to engage a selected point on the periphery of the last named member to shift said member and its supporting arm thereby to discontinue said feed and effect rapid retraction of said spindle.

4. A drilling machine combining a frame; a rotatable and translatable drill spindle; hydraulic transmission for translating said drill spindle; a valve adapted to control the action of said transmission; automatic means actuated in timed relation with the translation of said spindle to give to said spindle feeding and traversing movements; said means including an oscillatory shaft; an operative connection between said shaft and said control valve; two arms fixed to said shaft; a cam movable with said drill spindle and adapted to shift one of said arms thereby to cause shifting of said valve to discontinue traverse movement of said spindle and initiate a feeding movement thereof; a feed control member adjustably secured to the other of said arms and provided with a spiral periphery; a trip dog translatable with said spindle and adapted to engage a selected point on the periphery of the last named member to shift said member and its supporting arm thereby to discontinue said feed; a graduated dial rotatably adjustable synchronously with said feed control member; and means cooperating with the graduations on said dial to indicate the extent of spindle feed effected by any selected setting of said dial.

5. A drilling machine combining a frame; a feed bracket fixedly supported by said frame; a spindle rotatably and translatably journaled in said bracket; a hydraulic motor for translating said spindle; a fluid pressure line connected with said hydraulic motor; a control valve embodied in said line; automatically actuated means for shifting said valve to control the translation of said spindle, said automatic means including a spring normally tending to shift said valve; detent means acting in opposition to said spring to maintain the valve in a fixed position; a rock-arm journaled on said frame and operatively connected with said detent means and adapted to render it ineffective; a contact element adjustably carried by said rock arm; a trip dog movable with said spindle and adapted to engage and shift said contact element; and means to vary the contact element with respect to said trip dog.

6. A drilling machine as set forth in claim 5 in which the contact element is rotatably mounted on the rock-arm and is provided with a spiral contact surface.

7. A drilling machine as set forth in claim 5 in which the contact element is rotatably mounted on the rock-arm and has a spiral periphery adapted to be engaged by the trip dog, and detent means is provided to prevent accidental rotation of said contact element.

8. A drilling machine as set forth in claim 5 in which the contact element is rotatably mounted on the rock-arm and a graduated dial is connected with said element and cooperates with an indicator to rotate said contact element to various selected positions to give to said spindle any desired feeding movement.

9. A machine tool combining a translatable spindle; a hydraulic transmission for actuating said spindle; a valve controlling said transmission; automatic means for actuating said valve to vary the translation of said spindle, said means comprising an actuating member translatable with said spindle; a rock-shaft; an operative connection between said rock-shaft and said valve; an arm having one end secured to said rock shaft; a contact element rotatably secured to the other end of said arm, said contact element having a spiral contact periphery maintained in the path of said actuating element; and means to rotate said contact element, selectively to present various points on said periphery to said actuating member, whereby the contact between said actuating member and contact element, and thereby reversal of translation of said spindle, is effected at various axial positions of said spindle.

10. A drilling machine combining a frame; a rotatable and translatable drill spindle; a hydraulic transmission for translating said drill spindle; a valve adapted to control the action of said transmission; automatic means controlling said valve and causing said transmission to give to said spindle feeding movements and to discontinue said feeding movements at a predetermined point in the travel of said spindle, said means including an oscillatory shaft; an operative connection between said shaft and said control valve; means to actuate said shaft to cause said valve to initiate a feeding movement of said spindle; an arm fixed to said shaft; a feed control member adjustably secured to said arm and provided with a spiral periphery; and a trip dog translatable with said spindle and adapted to engage a selected point on the periphery of said feed control member to shift said member and its supporting arm at a predetermined point in the travel of said spindle thereby to discontinue said feeding movement.

In witness whereof, we have hereunto subscribed our names.

ROBERT M. GALLOWAY.
CHARLES HENRY MUHL.